United States Patent
Park et al.

(10) Patent No.: US 9,557,861 B2
(45) Date of Patent: Jan. 31, 2017

(54) USER INTERFACE APPARATUS AND METHOD IN USER TERMINAL WITH A CAPACITIVE TOUCH INPUT SCHEME

(71) Applicant: SAMSUNG ELECTRONICS CO., LTD., Suwon-si (KR)

(72) Inventors: Hyun-Hee Park, Seoul (KR); Jong-Ho Kim, Seoul (KR); Ji-Young Yi, Suwon-si (KR); Hak-Gyun Bae, Andong-si (KR); Gun-Shik Shin, Suwon-si (KR); Min-Woo Lee, Hwaseong-si (KR); Seul-Ki Jang, Suwon-si (KR); Seung-Ah Ha, Seongnam-si (KR); Jeong-Hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/218,124

(22) Filed: Mar. 18, 2014

(65) Prior Publication Data

US 2014/0267161 A1 Sep. 18, 2014

(30) Foreign Application Priority Data

Mar. 18, 2013 (KR) ........................ 10-2013-0028867

(51) Int. Cl.
*G06F 3/044* (2006.01)
*G06F 3/041* (2006.01)
*G06F 3/0488* (2013.01)

(52) U.S. Cl.
CPC ............ *G06F 3/044* (2013.01); *G06F 3/0416* (2013.01); *G06F 3/04883* (2013.01); *G06F 3/04886* (2013.01)

(58) Field of Classification Search
None
See application file for complete search history.

(56) References Cited

U.S. PATENT DOCUMENTS

| 2010/0083162 | A1* | 4/2010 | Hernandez ................. 715/776 |
| 2011/0122087 | A1* | 5/2011 | Jang et al. .................. 345/174 |
| 2012/0075243 | A1* | 3/2012 | Doi .......................... G06F 3/044 345/174 |

FOREIGN PATENT DOCUMENTS

| KR | 10-2010-0136578 A | 12/2010 |
| KR | 10-2011-0057501 A | 6/2011 |

* cited by examiner

*Primary Examiner* — Kenneth B Lee, Jr.
(74) *Attorney, Agent, or Firm* — Sughrue Mion, PLLC

(57) ABSTRACT

A user interface apparatus and method in a user terminal that uses a capacitive touch input scheme are provided. The method includes monitoring an input signal that is generated by a touch on a touch panel; and in response to detecting an input signal generated by the touch, determining an area of the touch based on the input signal, and differently processing a selected command depending on the determined area.

21 Claims, 9 Drawing Sheets

USER INTERFACE APPARATUS AND METHOD IN USER TERMINAL WITH A CAPACITIVE TOUCH INPUT SCHEME

CROSS REFERENCE TO RELATED APPLICATION(S)

This application claims priority from Korean Patent Application No. 10-2013-0028867, filed in the Korean Intellectual Property Office on Mar. 18, 2013, the entire disclosure of which is incorporated herein by reference, in its entirety.

BACKGROUND

Field

Apparatuses and methods consistent with exemplary embodiments relate to a user interface apparatus and method in a user terminal, and more particularly, to a user interface apparatus and method in a user terminal that uses a capacitive touch input scheme.

Description of the Related Art

Portable electronic devices increasingly require intuitive input/output User Interfaces (UIs). UIs have evolved from the UIs that allow a user to enter information using, for example, a keyboard, a keypad, a mouse and the like, into intuitive UIs that allow a user to enter information by directly touching a screen with his/her fingertip, a stylus pen and the like, or by using voice.

UI technology has been developed to offer the human-centered user friendliness and intuitiveness. A typical example of the UI technology is to allow a user to communicate with a portable electronic device through the use of voice, making it possible for the user to enter or obtain his/her desired information.

A typical example of a portable electronic device may include a smart phone. The smart phone may provide many new functions by a variety of applications which are installed therein by the user.

The existing user terminal supporting touch panel-based note functions has not provided any way to link the note contents to other applications, as the touch panel-based note functions are mainly used to allow the user to simply make a note of the information using input means such as a fingertip, a stylus pen and the like.

The user terminal of the related art has failed to meet the user's needs to easily and intuitively manipulate more commands using a variety of input tools, as the user terminal of the related art uses the uniform command system even though it supports a variety of input tools.

To meet these needs, there is a growing demand for emotional UIs which provide the user with the feeling of actually writing a note on the paper, due to the prevalence of user terminals that use a stylus pen together with a capacitive touch input scheme.

The above information is presented as background information only in order to assist with an understanding of the present disclosure. No determination has been made, and no assertion is made, as to whether any of the above might be applicable as prior art with regard to the exemplary embodiments.

SUMMARY

One or more exemplary embodiments provide an apparatus and method for differently processing a selected command depending on the touch area in a user terminal supporting a capacitive touch input scheme.

One or more exemplary embodiments also provide an apparatus and method for changing the area, to which a selected command is to be applied, based on the detected touch area in a user terminal supporting a capacitive touch input scheme.

One or more exemplary embodiments also provide an apparatus and method for differently applying a command to be executed, depending on the type of input tool used by a user in a user terminal which supports a capacitive touch input scheme.

One or more exemplary embodiments also to provide an apparatus and method for classifying different command systems associated with a variety of input tools in a user terminal which supports a capacitive touch input scheme, thereby allowing a user to more intuitively control the user terminal.

In accordance with an aspect of an exemplary embodiment, there is provided a user interface method in a user terminal that uses a capacitive touch input scheme. The user interface method includes, in response detecting an input signal caused by a touch on a touch panel, determining an area of the touch based on the input signal; and differently processing a selected command depending on the determined area.

In accordance with an aspect of another exemplary embodiment, there is provided a user terminal for processing an input from a user by using a capacitive touch input scheme. The user terminal includes a monitoring circuit configured to monitor an input signal that is generated by a touch on a touch panel; and a processor configured to determine an area of the touch based on the input signal, and differently process a selected command depending on the determined area, in response to receiving an input signal generated by the touch and detected by the monitoring circuit.

According to an aspect of another exemplary embodiment, there is provided a user terminal for processing an input from a user by using a capacitive touch input scheme, the user terminal including: a processor configured to determine an area of a touch based on an input signal, and differently process a selected command depending on the determined area, in response to receiving an input signal generated by the touch and detected by the monitoring circuit.

The user terminal may further include a monitoring circuit configured to monitor an input signal that is generated by a touch on a touch panel. The processor may be configured to identify an input tool that was used during the touch, based on the detected input signal.

In response to the identified input tool being an input tool whose touch area is variable, the processor may be configured to determine an area of the touch based on the detected input signal.

In response to the selected command being a command to delete information displayed on a screen, the processor may be configured to delete information displayed on the screen depending on the determined area.

The processor may be configured to: set on the touch panel a first input tool whose touch area may be changed during a touch, and a second input tool whose touch area may not be changed during a touch on the touch panel; set commands which are to be processed in response to an input made by the first input tool; and set commands which are to be processed in response to an input made by the second input tool.

In addition, the processor may be configured to: process a command which corresponds to the signal input by the second input tool by additionally considering the input signal by the first input tool.

BRIEF DESCRIPTION OF THE DRAWINGS

The above and/or other aspects will be more apparent from the following description taken in conjunction with the accompanying drawings, in which.

DETAILED DESCRIPTION OF EXEMPLARY EMBODIMENTS

Figure 1:
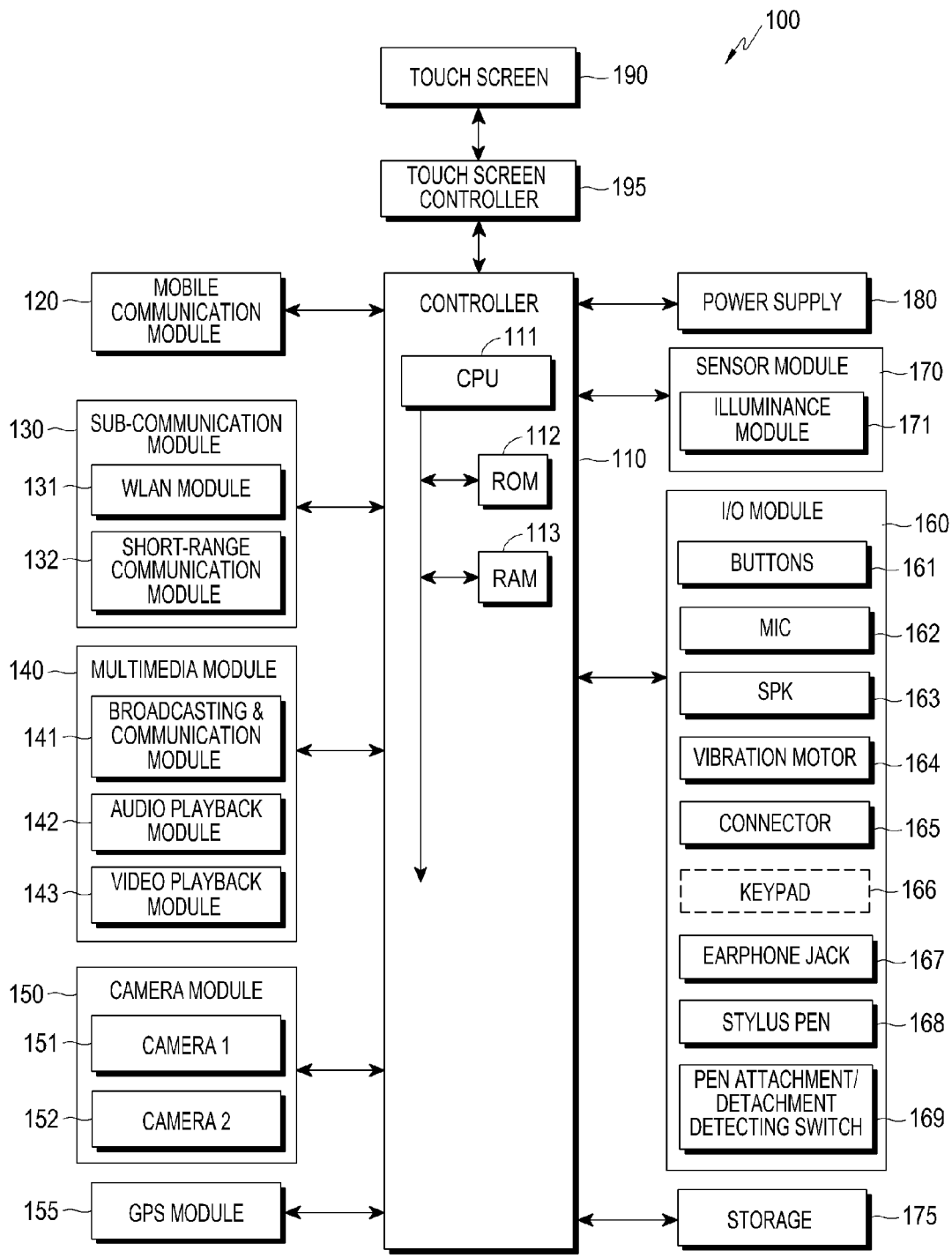
FIG. 1 schematically illustrates the function blocks of a wireless terminal, according to an exemplary embodiment.

The following description with reference to the accompanying drawings is provided to assist in a comprehensive understanding of the exemplary embodiments as defined by the claims and their equivalents. It includes various specific details to assist in that understanding, but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness. Throughout the drawings, like reference numerals will be understood to refer to like parts, components, and structures.

The terms and words used in the following description and claims are not limited to the bibliographical meanings, but, are merely used by the inventor to enable a clear and consistent understanding of the exemplary embodiments. Accordingly, it should be apparent to those skilled in the art that the following description of exemplary embodiments are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An aspect of exemplary embodiments provides a way to differently process a selected command depending on the touch area of a touch panel in a user terminal (or wireless terminal) which supports a capacitive touch input scheme.

To this end, the user terminal monitors whether an input signal is generated due to a touch on the touch panel, and performs a different operation depending on the touch area calculated based on the generated input signal. Differently processing a selected command depending on the touch area may only be applied to the case where an input tool that has generated an input signal by touching the touch panel may optionally adjust the touch area.

Therefore, the user terminal may separately set in advance an input which differently processes a selected command depending on the touch area, and another input which processes a selected command in the same way, regardless of the touch area. In addition, the user terminal may set in advance the commands to be processed, as a command group, for each set input, making it possible to easily perform an operation which corresponds to an input signal generated by the use of a variety of inputs.

In addition, the mobile terminal may set a command group with commands to be processed by a combination of input signals generated by the use of a plurality of different inputs. In this case, in response to an input signal being generated by the combined use of at least two input means, the mobile terminal may perform an operation which corresponds to a command that is set in advance to correspond to the input signal.

FIG. 1 schematically illustrates the function blocks of a wireless terminal according to an exemplary embodiment.

Referring to FIG. 1, a wireless terminal 100 includes a control block, a communication block, a User Interface (UI) block, an information processing block, and the like.

The control block refers to a set of function blocks provided to control the overall operation of the wireless terminal 100. The communication block refers to a set of function blocks provided for information exchange with external devices (not shown). The UI block refers to a set of function blocks provided for information exchange with the user. The information processing block refers to a set of function blocks provided to perform specific applications in the wireless terminal 100.

The control block corresponds to an illustrated controller 110. The controller 110 includes a Central Processing Unit (CPU) 111, a Read Only Memory (ROM) 112, and a RAM: Random Access Memory (RAM) 113.

The communication block may be connected to the external devices using a mobile communication module 120, a sub-communication module 130 and a connector 165. The term 'external device' as used herein may refer to a device capable of information exchange with the wireless terminal 100 through predetermined media. For example, the external devices may include Personal Computers (PCs), laptop PCs, content servers, web servers and the like. The predetermined media may include wired communication cables, wireless resource-based communication channels, and the like.

The sub-communication module 130 includes a wireless Local Area Network (LAN) module 131, a short-range communication module 132, and the like. The connector 165 is included in the communication block. Otherwise, the connector 165 may be included in the UI block.

The UI block, means for information exchange with the user, includes a touch screen 190, a touch screen controller 195, a camera module 150, a sensor module 170, an Input/Output (I/O) module 160 and the like. The camera module 150 includes one or multiple cameras (for example, a first camera 151 and a second camera 152). The I/O module 160 includes at least one of a button(s) 161, a microphone (MIC)

162, a speaker (SPK) 163, a vibration motor 164, the connector 165 (which can also be part of the communication block), a keypad 166, an earphone jack 167, a stylus pen 168, and a pen attachment/detachment detecting switch 169.

The information processing block includes a multimedia module 140, a Global Positioning System (GPS) module 155, a storage 175, and the like. The multimedia module 140 includes at least one of a broadcasting & communication module 141, an audio playback module 142 and a video playback module 143.

As to the configuration of the control block, the CPU 111 may include a single-core CPU, a dual-core CPU, a triple-core CPU, a quad-core CPU, and a quintuple or more-core CPU. The CPU 111 controls the actual operation of the wireless terminal 100. The ROM 112 stores a control program for control of the wireless terminal 100, and the RAM 113 temporarily stores the signals or data received from the outside of the wireless terminal 100, and/or is used as a workspace for the operations performed in the wireless terminal 100.

The CPU 111, the ROM 112 and the RAM 113 may be connected to each other via an interval bus.

The controller 110 may control the mobile communication module 120, the sub-communication module 130, the multimedia module 140, the camera module 150, the GPS module 155, the I/O module 160, the sensor module 170, a power supply 180, the storage 175, the touch screen 190, and the touch screen controller 195.

If the user touches the touch screen 190 using one of a variety of possible touch input tools, the controller 110 detects the touch by means of the touch screen controller 195. The controller 110, if necessary, may display the detected contents on the touch screen 190 by controlling the touch screen controller 195.

If an input signal is provided by the user's manipulation on the touch screen 190, the controller 110 may determine the input tool used by the user, the touch area and the like based on the provided input signal. Based on the determined information, the controller 110 may control the associated blocks to perform an operation which corresponds to a selected command.

For example, the controller 110 monitors an input signal that is generated by a touch on the touch screen 190, and calculates an area of the touch based on the input signal generated by the touch. The controller 110 differently processes a selected command depending on the calculated area. In other words, the controller 110 determines how it will process the selected command, depending on the size of the calculated area. To this end, the controller 110 may identify the input tool used by the user based on the input signal generated by the touch, and may additionally consider the type of the identified input tool when determining how it will process the selected command.

As to the configuration of the communication block, the mobile communication module 120, under control of the controller 110, may connect the wireless terminal 100 to the external devices by mobile communication using one or multiple antennas (not shown). For example, the mobile communication module 120 exchanges radio signals for voice calls, video calls, Short Message Service (SMS) messages, Multimedia Messaging Service (MMS) messages and the like, with cellular phones, smart phones, tablet PCs, other devices and the like, the phone numbers of which are entered in the wireless terminal 100.

The sub-communication module 130 may include at least one of the wireless LAN module 131 and the short-range communication module 132. For example, the sub-communication module 130 may include one or both of the wireless LAN module 131 and the short-range communication module 132.

The wireless LAN module 131, under control of the controller 110, may access the Internet in the place where a wireless Access Point (AP) is installed. The wireless LAN module 131 supports the wireless LAN standard IEEE 802.11x proposed by Institute of Electrical and Electronics Engineers (IEEE).

The short-range communication module 132, under control of the controller 110, may support short-range communication between the wireless terminal 100 and an image forming apparatus. The short-range communication may include Bluetooth® communication, Infrared Data Association (IrDA) communication, and the like.

The wireless terminal 100 may include at least one of the mobile communication module 120, the wireless LAN module 131 and the short-range communication module 132, depending on its performance. For example, the wireless terminal 100 may include a combination of the mobile communication module 120, the wireless LAN module 131 and the short-range communication module 132, depending on its performance.

As to the configuration of the UI block, the camera module 150 includes at least one camera that captures still images or videos under control of the controller 110. In the drawing, the camera module 150 is assumed to include two cameras: the first camera 151 and the second camera 152. At least one of the first and second cameras 151 and 152 may include a secondary light source (for example, a flash (not shown)) for providing the light needed for image/video capturing. The first camera 151 may be mounted on the front of the wireless terminal 100, while the second camera 152 may be mounted on the rear of the wireless terminal 100.

The I/O module 160 may include at least one of the buttons 161, the microphone 162, the speaker 163, the vibration motor 164, the connector 165 and the keypad 166. The buttons 161 may be formed on the front, side and/or rear of the housing of the wireless terminal 100. The buttons 161 may include at least one of a power/lock button, a volume button, a menu button, a home button, a back button and a search button.

The microphone 162, under control of the controller 110, may generate electrical signals by receiving voice or sound.

The speaker 163, under control of the controller 110, may output, to the outside, the sound corresponding to various signals (for example, wireless signals, broadcast signals, digital audio files, digital video files, picture-taking tones and the like) from the mobile communication module 120, the sub-communication module 130, the multimedia module 140 and/or the camera module 150. The speaker 163 may output the sounds (for example, button manipulation tones and ring back tones for phone calls) corresponding to the functions performed by the wireless terminal 100. One or multiple speakers 163 may be formed in a proper position or positions of the housing of the wireless terminal 100.

The vibration motor 164, under control of the controller 110, may convert electrical signals into mechanical vibrations. One or multiple vibration motors 164 may be formed in the housing of the wireless terminal 100. For example, upon receiving a call from another device while vibration mode is set, the vibration motor 164 operates under control of the controller 110. As another example, the vibration motor 164 may operate in response to an action that the user touches the touch screen 190, and to a continuous movement (or drag) of a touch on the touch screen 190.

The connector 165 may be used as an interface for connecting the wireless terminal 100 to the external devices, a power source, and the like. In other words, the connector 165, under control of the controller 110, may transmit and receive data to/from the external devices via a wired cable connected thereto. In addition, the connector 165 may receive power supplied from the power source via the connected wired cable, and provide the received power to a rechargeable battery (not shown) as charging voltage.

The keypad 166 may receive key inputs from the user, for control of the wireless terminal 100. To this end, the keypad 166 includes keys which can be manipulated by the user. The keys provided on the keypad 166 may include not only the physical keys, but also the virtual keys displayed on the touch screen 190. The physical keys are optional depending on the performance and/or structure of the wireless terminal 100.

The sensor module 170 includes at least one sensor for detecting the status of the wireless terminal 100. For example, the sensor module 170 may include a proximity sensor, an illuminance sensor, and an acceleration sensor. The proximity sensor may detect whether the user is close to the wireless terminal 100, or may detect whether the user's fingertip or a stylus pen is close onto the touch screen 190. The illuminance sensor may detect an amount of light around the wireless terminal 100. The acceleration sensor may detect the movement (for example, rotation, acceleration, vibration and the like) of the wireless terminal 100.

At least one sensor constituting the sensor module 170 may detect the status of the wireless terminal 100, including the direction and slope of the wireless terminal 100, generate a signal which corresponds to the detection, and transfer the generated signal to the controller 110. The sensors constituting the sensor module 170 may be added or removed depending on the performance of the wireless terminal 100.

The touch screen 190 may provide to the user a UI function for various services (for example, calls, data transmission, broadcasting, picture taking and the like). The touch screen 190 may transfer an analog signal which corresponds to at least one touch made by the user, to the touch screen controller 195. The touch screen 190 may detect at least one touch made with various substances such as, for example, the user's body (for example, fingers including the thumb) and the touch input tool (for example, an electronic pen or a stylus pen). The touch screen 190 may receive a continuous movement (or drag) of at least one touch. Upon detecting a touch or a continuous movement of a touch, the touch screen 190 may transfer an analog signal which corresponds thereto to the touch screen controller 195.

The term 'touch' as used herein may be construed to include not only the physical touch between the touch screen 190 and the user's body or the touch input tool, but also the non-contact touch between them. The gap at which the touch screen 190 may detect the non-contact touch is subject to change depending on the performance and/or structure of the wireless terminal 100.

The touch screen 190 may be implemented in various different types. For example, the touch screen 190 may be implemented in a resistive type, a capacitive type, an infrared type, an Electronic Magnetic Resonance (EMR) type, an acoustic wave type, a combination thereof, or the like.

The touch screen 190, under control of the touch screen controller 195, may display the note contents recognized by the controller 110, and delete the edited note contents at a delete request of the user.

As to the configuration of the information processing block, the multimedia module 140 may include the broadcasting & communication module 141, the audio playback module 142 and/or the video playback module 143.

The broadcasting & communication module 141, under control of the controller 110, may receive broadcast signals (for example, TV broadcast signals, radio broadcast signals, data broadcast signals or the like) and additional broadcast information (for example, Electric Program Guide (EPG) information, Electric Service Guide (ESG) information or the like), which are sent from the broadcasting stations via broadcasting & communication antennas.

The audio playback module 142, under control of the controller 110, may play the stored or received digital audio files (with a file extension of, for example, mp3, wma, ogg or way).

The video playback module 143, under control of the controller 110, may play the stored or received digital video files (with a file extension of, for example, mpeg, mpg, mp4, avi, mov or mkv). The video playback module 143 may play digital audio files.

The multimedia module 140 may include the audio playback module 142 and the video playback module 143, excluding the broadcasting & communication module 141. The audio playback module 142 and/or the video playback module 143 in the multimedia module 140 may be incorporated into the controller 110.

The GPS module 155 receives radio waves from a plurality of GPS satellites in Earth orbit. The GPS module 155 may calculate the location of the wireless terminal 100 using the Time of Arrival (ToA) of radio waves from the GPS satellites to the wireless terminal 100.

The storage 175, under control of the controller 110, may store the signals and/or data which are received/output to correspond to operations of the mobile communication module 120, the sub-communication module 130, the multimedia module 140, the camera module 150, the GPS module 155, the I/O module 160, the sensor module 170, and the touch screen 190. The storage 175 may store a control program which controls the wireless terminal 100 or the controller 110, and a variety of applications.

The term 'storage' as used herein may be construed to include the storage 175, the ROM 112 and the RAM 113 in the controller 110, and a memory card (for example, a Secure Digital (SD) card, a memory stick and the like) mounted in the wireless terminal 100. The storage 175 may include a non-volatile memory, a volatile memory, a Hard Disc Drive (HDD) or a Solid State Drive (SSD).

The power supply 180, under control of the controller 110, may supply power to one or multiple batteries mounted in the housing of the wireless terminal 100. The one or multiple batteries supply driving power (or operating power) of the wireless terminal 100. The power supply 180 may supply the power, which is received from the external power source via a wired cable connected to the connector 165, as the operating voltage of the wireless terminal 100.

Figure 2:
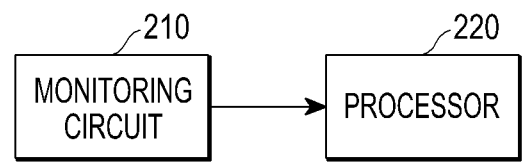
FIG. 2 illustrates function blocks provided in a user terminal and processing a selected command in response to the user's manipulation according to an exemplary embodiment.

FIG. 2 illustrates function blocks provided in a user terminal and processing a selected command in response to the user's manipulation according to an exemplary embodiment of the present invention. The function blocks illustrated in FIG. 2 may be implemented by a combination of hardware or software blocks involved in performing a specific function among the components described with reference to FIG. 1.

Referring to FIG. 2, a monitoring circuit 210 monitors whether an input signal is generated by a manipulation such as a touch that the user has made on the touch panel using one of the input tools supporting a capacitive touch input scheme. Upon detecting an input signal, the monitoring circuit (corresponding to the touch screen 190) 210 outputs the detected input signal as a detection signal.

A processor (corresponding to the touch screen controller 195) 220 processes a selected command based on the detection signal (or the input signal generated by the user's manipulation) provided by the monitoring circuit 210. For example, the processor 220 calculates an area of the touch made by the user based on the detection signal, and processes the selected command differently, depending on the calculated area.

The command to be processed may be selected in advance by the user, or may be additionally selected by the user after the detection signal is received. It will be apparent to those of ordinary skill in the art that the command to be processed may be selected based on the detection signal.

As to differently processing a selected command, this means that even though a specific command has been selected, the processor 220 may perform other operations depending on which input tool was used for the touch on the touch panel, or whether the touch area is wide or narrow. For example, the processor 220 may process a delete area differently even in performing the same delete operation, depending on whether the user has selected the delete area using a stylus pen or his/her fingertip after he/she selected a delete command.

To this end, the processor 220 may have a separate storage area, or may be allocated some area of the internal memory. The processor 220 may manage identification information for a first input tool whose touch area may be adjusted by the user during information entry, and identification information for a second input tool whose touch area may not be adjusted by the user during information entry. The processor 220 may manage the identification information in an accessible storage area. Typically, the first input tool may be a fingertip, and the like. The second input tool may be a stylus pen, and the like.

The processor 220 may manage a command group including commands to be processed in response to a user's touch made with the first input tool and a command group including commands to be processed in response to a user's touch made with the second input tool. The processor 220 may manage the command groups using an accessible storage area.

In order to differently process a selected command, the processor 220 may additionally consider the type of input tool in calculating the touch area. For example, the processor 220 may identify the input tool used by the user, based on the input signal provided by the user's touch. To this end, the processor 220 may use identification information for the input tool, which is managed in a storage area. The processor 220 may calculate the touch area based on the input signal, only in response to the input tool identified based on the input signal being an input tool whose touch area may be adjusted by the user.

As an example, a description will be made of an operation of the processor 220, which is performed in response to the user requesting deletion of the information displayed on the screen using an input tool whose touch area may be arbitrarily determined by the user.

Upon receiving an input signal, the processor 220 checks a delete area decision option that is set in advance in order to delete information displayed on the screen.

in response to the delete area decision option being set as 'fix', the processor 220 determines the touch area calculated based on the input signal as a delete area on the screen.

Otherwise, in response to the delete area decision option being set as 'change' such as 'reduce' and 'extend,' the processor 220 determines a delete area on the screen by reducing or extending the touch area calculated based on the input signal, at a predetermined ratio. A predetermined ratio for the reduction may be different from a predetermined ratio for the extension.

Figure 3:
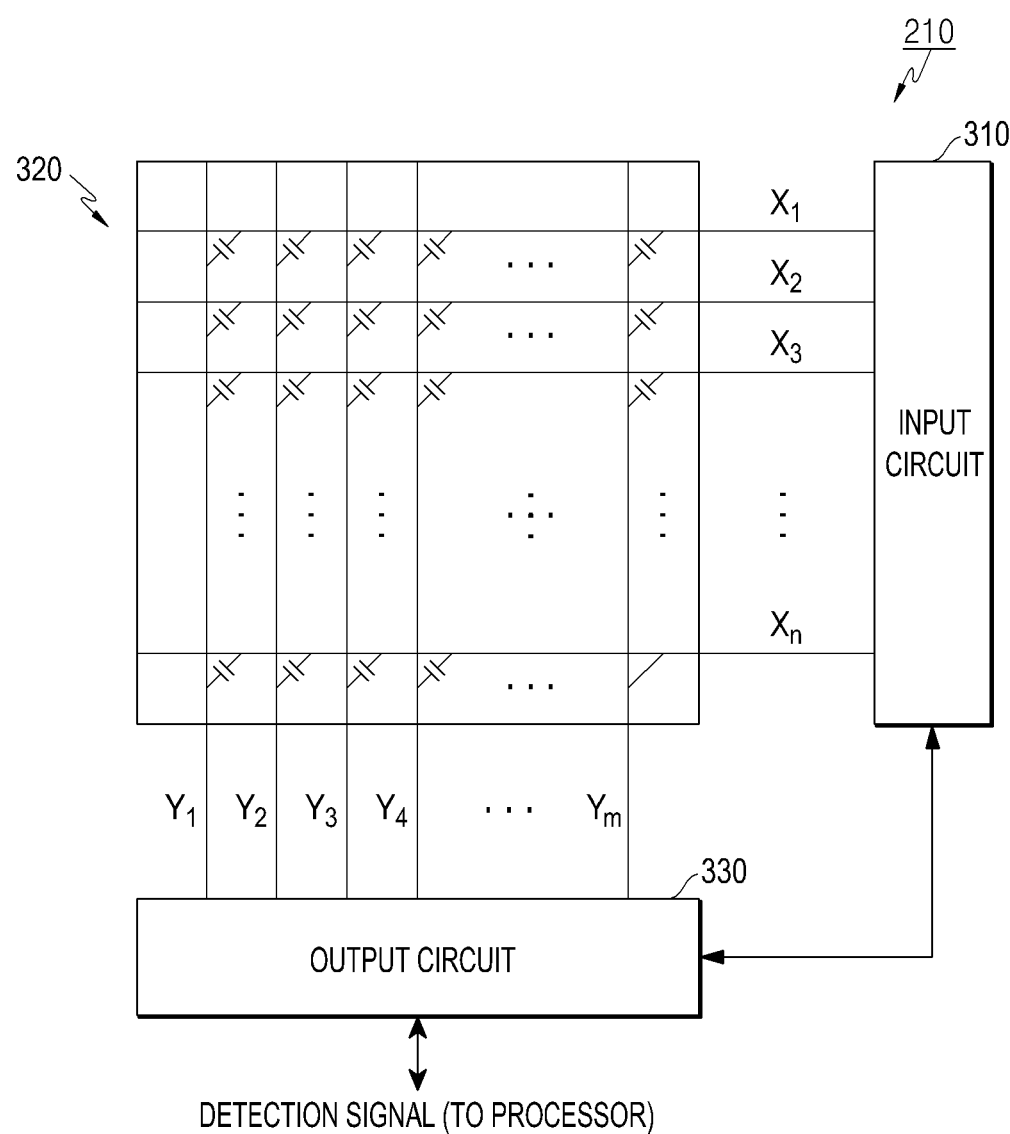
FIG. 3 illustrates the detailed structure of the monitoring circuit 210 illustrated in FIG. 2.

FIG. 3 illustrates the detailed structure of the monitoring unit 210 illustrated in FIG. 2.

Referring to FIG. 3, the monitoring circuit 210 includes an input circuit 310, a touch screen panel 320 and an output circuit 330.

The input circuit 310 sequentially inputs a drive signal to a plurality of driving lines $X_1, X_2 \ldots X_n$ constituting the touch screen panel 320.

The touch screen panel 320 includes a plurality of driving lines $X_1, X_2 \ldots X_n$ arranged in a first direction, a plurality of sensing lines $Y_1, Y_2 \ldots Y_m$ arranged in a direction crossing that of the driving lines $X_1, X_2 \ldots X_n$, and a plurality of sensing cells formed at the intersections between the driving lines $X_1, X_2 \ldots X_n$ and the sensing lines $Y_1, Y_2 \ldots Y_m$.

The output circuit 330 detects a change in capacitance, which is detected by each of the sensing cells constituting the touch screen panel 320, and generates a detection signal which corresponds thereto.

The plurality of driving lines and sensing lines are formed on different layers on a transparent substrate (not shown). The driving lines and the sensing lines may be implemented with a transparent conductive material. The transparent conductive material may include Indium-Tin-Oxide (ITO), Indium-Zinc-Oxide (IZO) or Carbon Nano Tube (CNT). An insulating layer (not shown) serving as dielectric is formed between the driving lines and the sensing lines.

Although it is assumed that the driving lines and the sensing lines are arranged to be orthogonal with each other, it will be apparent to those of ordinary skill in the art that a variety of other types of arrangements are possible such as the arrangement of concentric lines and radial lines in polar coordinates.

A mutual capacitance $C_M$ between a driving line and a sensing line is formed at the points where the driving lines and the sensing lines cross each other. Each intersection, at which the mutual capacitance is formed, serves as each sensing cell that implements touch recognition. The mutual capacitance created in each sensing cell occurs only when the input circuit 310 applies a drive signal to the driving line connected to the sensing cell. In other words, as a driving line and a sensing line are connected to each other by an associated sensing cell, a detection signal is output via the connected sensing line only in response to a drive signal being applied to the driving line connected to the sensing cell.

The input circuit 310 sequentially provides a drive signal to the driving lines. The other driving lines, except for the driving line to which a drive signal is provided, maintain the ground state. As a result, a mutual capacitance will be formed at a plurality of intersections (for example, sensing cells) connected to the driving line to which a drive signal is applied.

For example, in response to the user touching the touch screen panel 320 with an input tool such as a fingertip and a stylus pen, a change in capacitance may occur in at least one sensing cell in response to the touch. In terms of the touch area, the input tool whose touch area may be adjusted by the user's will, such as a fingertip, may be wider than the input tool whose touch area may not be adjusted by the user's will, such as a stylus pen.

The expression 'touch area is wide' may mean that the sensing cells, at which a change in capacitance has occurred, are widely distributed with possible time delays. Therefore, it may be possible to determine the characteristics of the input tool that the user has used when touching the touch screen panel 320, i.e., to determine whether the input tool is an input tool whose touch area may be adjusted, based on the detection signal output by the output circuit 330.

As mentioned above, in response to there being no conductive substance (for example, an input tool such as a fingertip, a stylus pen and the like) close to an intersection (for example, a sensing cell) between a driving line and a sensing line, there is no change in the mutual capacitance CM occurring in the sensing cell. A change in mutual capacitance only occurs in response to the conductive substance being close to or in contact with a sensing cell. The change in mutual capacitance results in a change in current and/or voltage carried on a sensing line connected to the sensing cell.

Accordingly, the output circuit 330 connected to the sensing line converts information (or detection signal) related to the change in capacitance and the position of at least one sensing cell into a predetermined form by using Analog-to-Digital Conversion (ADC), and outputs the conversion results.

For example, the output circuit 330 may be in contact with a plurality of sensing cells which exist in a direction of one driving line, to which a drive signal is applied by a conductive substance. In this case, as a change in capacitance is detected at a plurality of sensing cells, it is possible to predict that the conductive substance in contact is a substance whose contact area may be changed by the user's intent. However, it may be preferable to predict or determine the substance based on the change in capacitance, which is detected after a drive signal is sequentially applied to the plurality of driving lines.

An example of a way to detect a position of the sensing cell, at which a change in capacitance has occurred, will be described. The output circuit 330 detects a change in capacitance of a sensing line connected to the sensing cell. By doing so, the output circuit 330 may obtain the coordinates which correspond to at least one sensing cell in contact with the conductive substance based on the coordinates of the sensing line at which a change in capacitance has occurred and the coordinates of the driving line to which a drive signal is input from the input circuit 310.

As the output circuit 330 is implemented by being connected to the input circuit 310 via a wire (not shown), the input circuit 310 scans (or sequentially applies a drive signal to) the driving lines and then continuously outputs the coordinates of the scanned driving lines to the output circuit 330. As a result, upon detecting a change in capacitance in a sensing line, the output circuit 330 may obtain the coordinates which correspond to the point where the capacitance is changed, i.e., the position of a driving line which corresponds to the sensing cell.

A touch screen system having this configuration and according to an exemplary embodiment may recognize a plurality of contact points, i.e., may recognize the input tool used by the user and the touch area.

Figure 4:
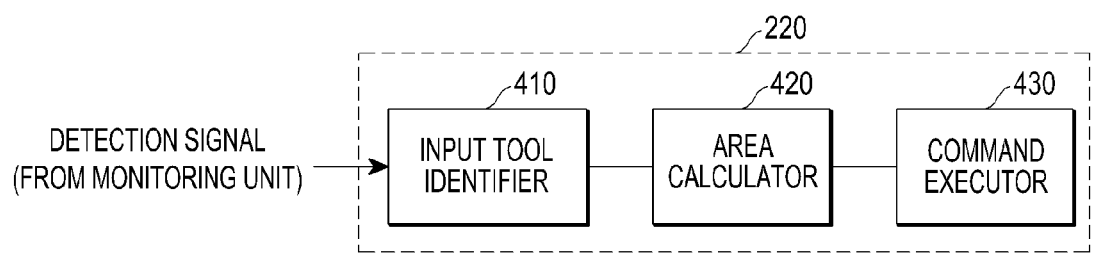
FIG. 4 illustrates a detailed structure of the processor 220 illustrated in FIG. 2.

FIG. 4 illustrates a detailed structure of the processor 220 as illustrated in FIG. 2.

Referring to FIG. 4, based on a detection signal, an input tool identifier 410 identifies the input tool that the user used when touching the touch panel. The detection signal is provided from the monitoring circuit 210.

For example, the input tool identifier 410 may identify the input tool used by the user depending on at least one of the amount of the change in capacitance and the range where the change in capacitance has occurred. The amount of the change in capacitance and the range where the change in capacitance has occurred may be detected based on the detection signal.

Generally, there is a subtle difference between a change in mutual capacitance, which is detected as a fingertip is in contact with the touch panel, and a change in mutual capacitance, which is detected as a stylus pen is in contact with the touch panel. The subtle difference which corresponds to the change in mutual capacitance makes it possible to determine which input tool the user has used.

As another example, the area where a change in mutual capacitance occurs as a fingertip is in contact with the touch panel is different from the area where a change in mutual capacitance occurs as a stylus pen is in contact with the touch panel. In particular, for an input tool (or first input tool) such as a fingertip, its touch area where the input tool is in contact with the touch panel may be adjusted according to the intent of the user. However, for an input tool (or second input tool) such as a stylus pen, its touch area where the input tool is in contact with the touch panel may not be adjusted according to the user's intent.

Therefore, the number of sensing cells where a change in mutual capacitance has occurred makes it possible to determine which input tool the user has used.

In accordance with the above examples, the input tool identifier 410 may identify which input tool the user has used when touching the touch panel.

In order to quickly and accurately identify the input tool used by the user, the input tool identifier 410 may use an input tool identification table. To this end, it may be preferable that the input tool identification table is determined in advance. In other words, the input tools that can be used by the user are classified, and an input tool identification table is made based on information related to the classified input tools. The input tool identification table may be managed in a storage medium.

For example, the information related to the input tools, which is managed in the input tool identification table, may be information related to a change in general mutual capacitance which occurs when an input tool is used, for each input tool recognizable on the touch panel.

If the input tool identification table is prepared in advance, the input tool identifier 410 may check the used input tool from the input tool identification table based on the received detection signal.

In response to the user having used the first input tool, an area calculator 420 calculates the touch area determined by the first input tool. The first input tool, as defined above, refers to an input tool whose touch area may be intentionally changed by the user. For example, the area calculator 420 may receive information related to the input tool used by the user, from the input tool identifier 410.

To calculate the touch area, the area calculator 420 may use a detection signal. An example of calculating the touch area using the detection signal has been disclosed above, so a detailed description thereof will be omitted.

A command executer 430 processes a selected command using information related to the identified input tool, the touch area, and the like. The selected command may be selected by the user before he/she touches the touch panel, or may be selected by the user after he/she touches the touch panel. In addition, the selected command may be a command requested by a detection signal caused by the touch.

Even for the same command, the command executer 430 may perform a different operation depending on the touch area calculated by the area calculation unit 420. A typical example of the different operation may include a delete operation. The delete operation may refer to an operation of deleting from the screen some or all of the information displayed on the screen.

Figure 5:
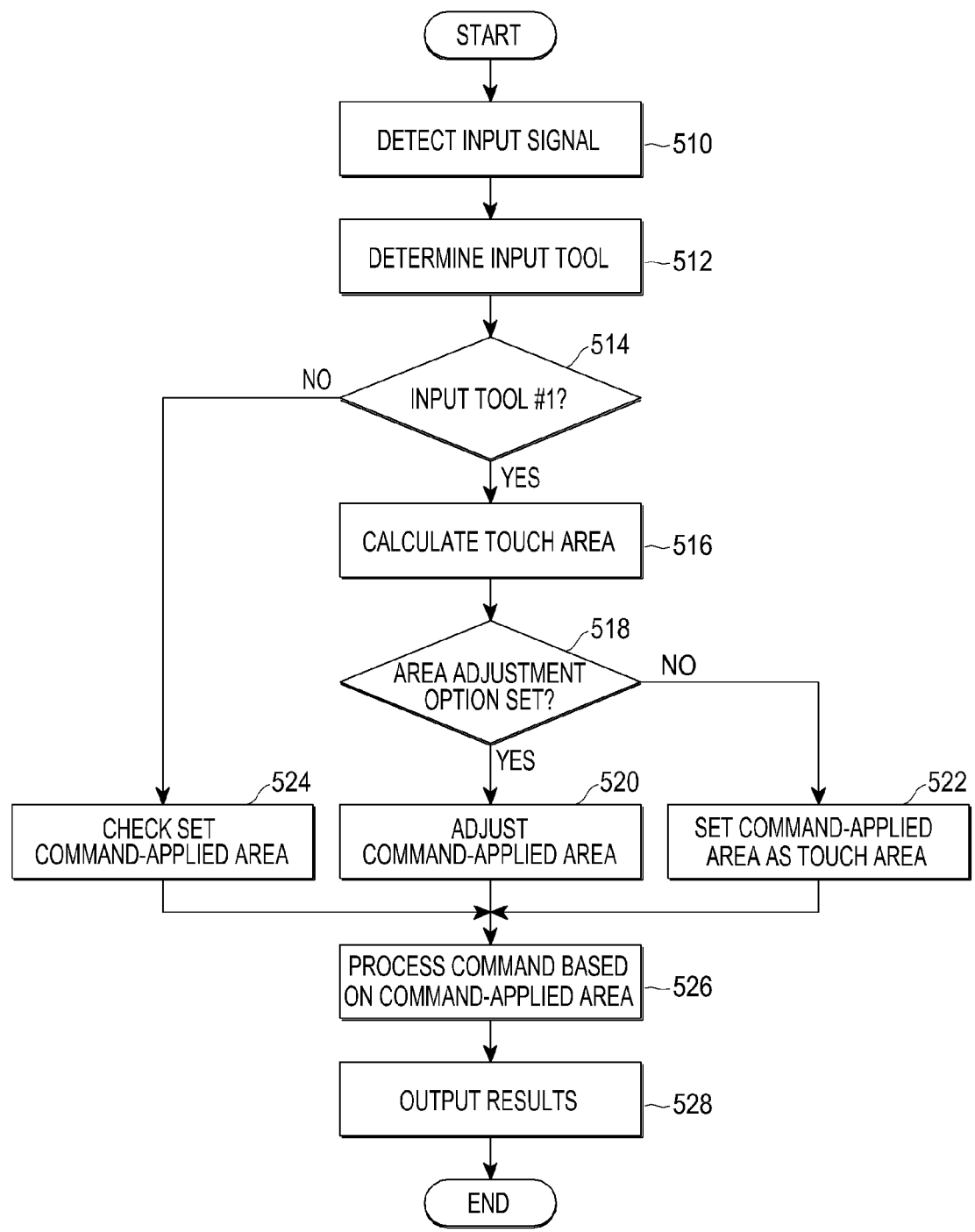
FIG. 5 illustrates a control flow for a user interface operation in a user terminal according to an exemplary embodiment.

FIG. 5 illustrates a control flow for a user interface operation in a user terminal according to an exemplary embodiment.

Referring to FIG. 5, the user terminal detects an input signal that the user has created using a predetermined input tool on the touch panel in a contact or non-contact fashion (Operation 510). Upon detecting the input signal, the user terminal determines the input tool used by the user, based on the detected input signal (Operation 512).

Based on the determination results, the user terminal determines whether the input tool used by the user is a first input tool (Operation 514). The first input tool, as defined above, refers to an input tool (for example, a fingertip) whose touch area may be adjusted according to the user's will.

In response to a determination that the first input tool has been used by the user, the user terminal calculates the touch area based on the detected input signal (Operation 516). Subsequently, the user terminal determines if an area adjustment option is set or activated (Operation 518).

In response to the area adjustment option being activated, the user terminal sets up a command-applied area by reducing or extending the calculated touch area (Operation 520). On the other hand, in response to the area adjustment option not being activated, the user terminal sets up the calculated touch area as a command-applied area (Operation 522).

In response to a determination that the user has used the second input tool, the user terminal sets up a command-applied area according to the rules which are set based on the center point of the touched area (Operation 524). This is equivalent to equally applying the existing way of determining a command-applied area without considering the input tool and the touch area.

After completion of setting up the command-applied area, the user terminal processes a selected command based on the set command-applied area (Operation 526). The examples of processing a selected command have been described in detail, so a detailed description thereof will be omitted.

The user terminal provides the command processing results to the user (Operation 528). The command processing results may be provided to the user through a variety of UIs, in addition to being displayed on the screen.

Figure 6:
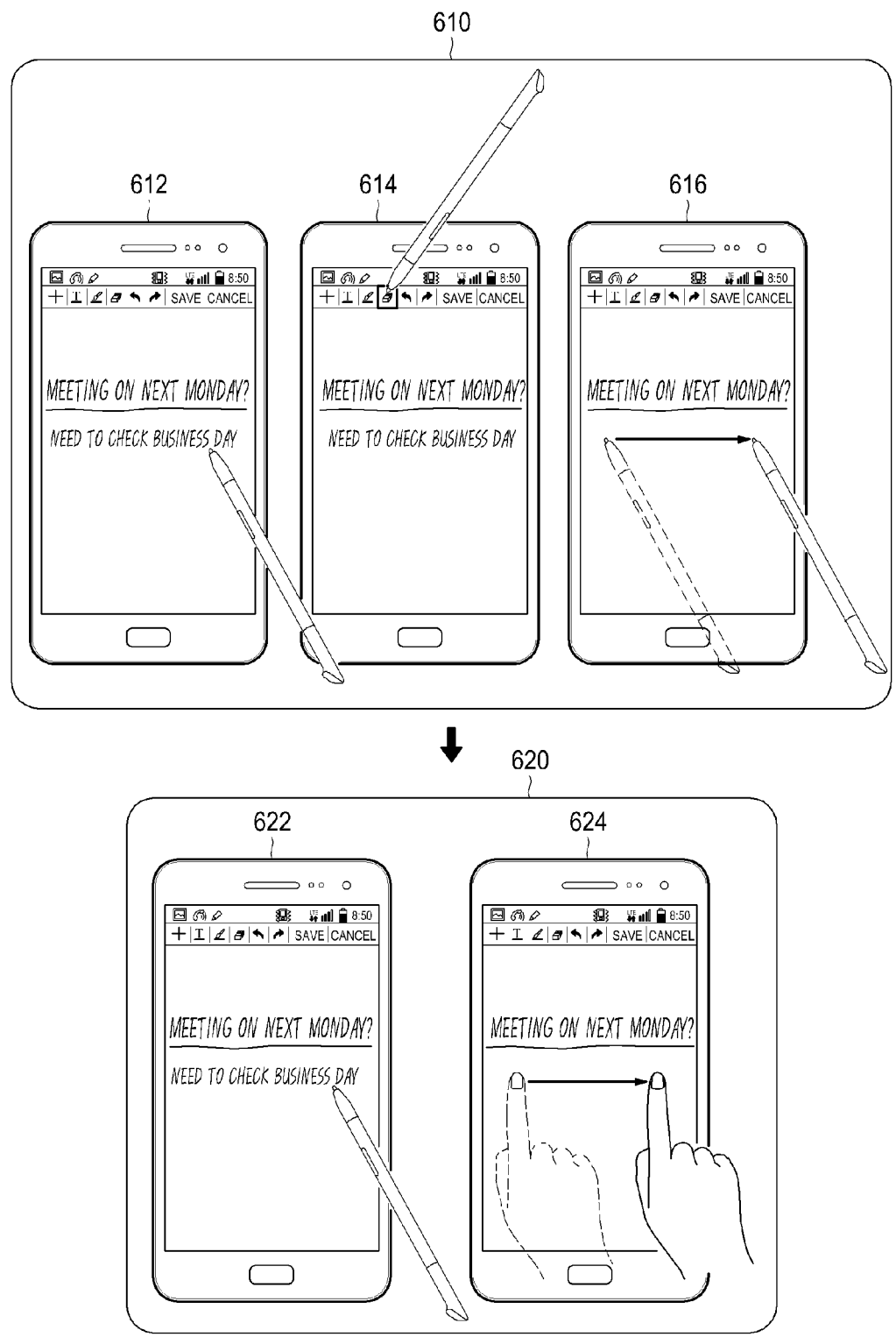
FIG. 6 illustrates an example of a difference between a general delete operation 610 and a proposed delete operation 620.

FIG. 6 illustrates an example of a difference between a general delete operation 610 and a proposed delete operation 620.

Referring to FIG. 6, the general delete operation 610 includes an operation 612 in which the user creates a note on the screen using a stylus pen, an operation 614 in which the user selects a menu which corresponds to a delete function if he/she needs to delete the note contents during the note operation, and an operation 616 in which the user selects and deletes specific note contents using the stylus pen after the delete function is activated.

The delete operation 620 proposed by the exemplary embodiments includes an operation 622 in which the user makes a note on the screen using a stylus pen, and an operation 624 in which the user selects and deletes specific note contents using his/her fingertip in response to he/she needing to delete the note contents during the note operation.

The proposed delete operation 620 is available because it is possible to detect the change in input tool used by the user, and the touch area determined by a specific input tool.

As described above, it is noted that the proposed delete operation 620 is simplified compared with the general delete operation 610, in terms of the procedure.

Figure 7:
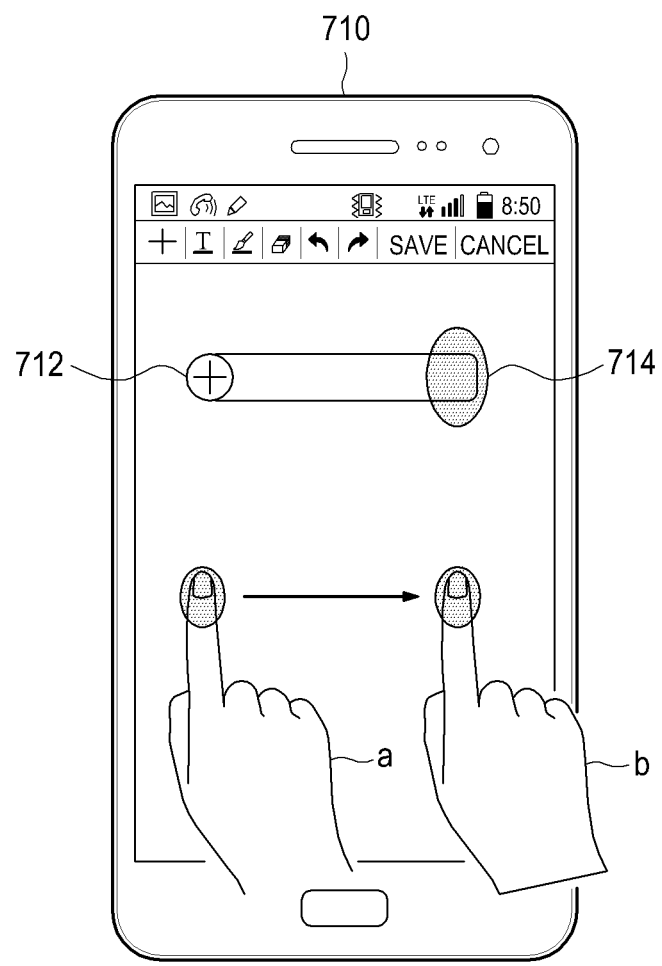
FIGS. 7 and 8 illustrate different examples of determining a command-applied area based on the actual touch area according to an exemplary embodiment.
Figure 8:
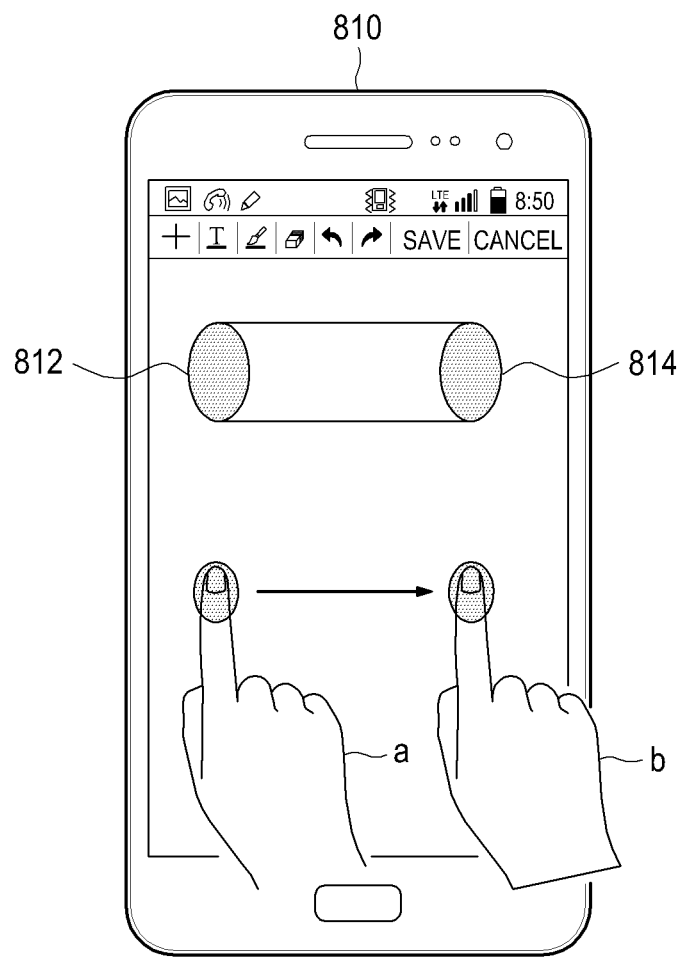

FIGS. 7 and 8 illustrate different examples of determining a command-applied area based on the actual touch area according to an exemplary embodiment. For example, FIG. 7 illustrates an example where the actual touch area does not match with the command-applied area, while FIG. 8 illustrates an example where the actual touch area matches with the command-applied area.

Referring to FIG. 7, the user has selected a specific area on the screen by shifting his/her fingertip from a position 'a' to a position 'b' while touching the screen. It is noted that while the area actually touched by the fingertip is large as indicated by reference numeral 714, the area to which a command is to be applied is reduced as indicated by reference numeral 712. Although not illustrated in the drawing, it may be possible to extend the area actually touched by the fingertip, and determine it as the area to which a command is to be applied.

Referring to FIG. 8, the user has selected a specific area on the screen by shifting his/her fingertip from a position 'a' to a position 'b' while touching the screen. It is noted that the area 814 actually touched by the fingertip matches with the area 812 to which a command is to be applied.

In order to selectively apply an option to reduce or extend the actually touched area and determine it as an area to which a command is to be applied, or an option to determine the actually touched area as an area to which a command is to be applied, it may be preferable to set a relation function in advance.

For example, the user activates an option (for example, a 'delete area decision option') to determine a command-applied area determined by user touch. After activating the delete area decision option, the user sets whether he/she will extend the selected touch area and determine it as a delete area, or whether he/she will reduce the selected touch area and determine it as a delete area. In addition, the user may set to fix the selected touch area, i.e., to determine the actual touch area as a delete area.

In response to setting to reduce or extend the actual touch area and determine it as an area to which a command is to be applied, it may be preferable to separately set a ratio for the reduction or a ratio for the extension. The two ratios may be set independently or in common.

For the above-described operation, there is a need to use a touch detection scheme different from the existing touch detection scheme. In other words, for the exemplary embodiments, a touch command needs to be able to be delivered to all the area that the input tool, whose touch area may be wide, such as a fingertip, is in contact with on the touch panel. Based on the touch command delivered to all of the area that the input tool is in contact with, a selected command needs to be able to be executed.

In the related art, for example, the center point is determined depending on the change in capacitance at the portion that a fingertip and the like is in contact with, and based thereon, a command is executed for the area having a specific width. However, in the exemplary embodiments, all the area is recognized, in which a change in capacitance is observed, and a command is executed for all of the recognized area.

In addition, the command executer 430 may process a different command depending on the type of the input tool. To this end, the command executer 430 may separately set a list of commands which are to be processed in response to an input made by each of the first input tool and the second input tool.

For example, upon receiving a detection signal resulting from use of the first input tool, the command executer 430 performs an operation which corresponds to a command selected from the command list set to correspond to the first input tool. Otherwise, upon receiving a detection signal by the second input tool, the command executer 430 performs an operation which corresponds to a command selected from the command list set in order to correspond to the second input tool.

Figure 9:
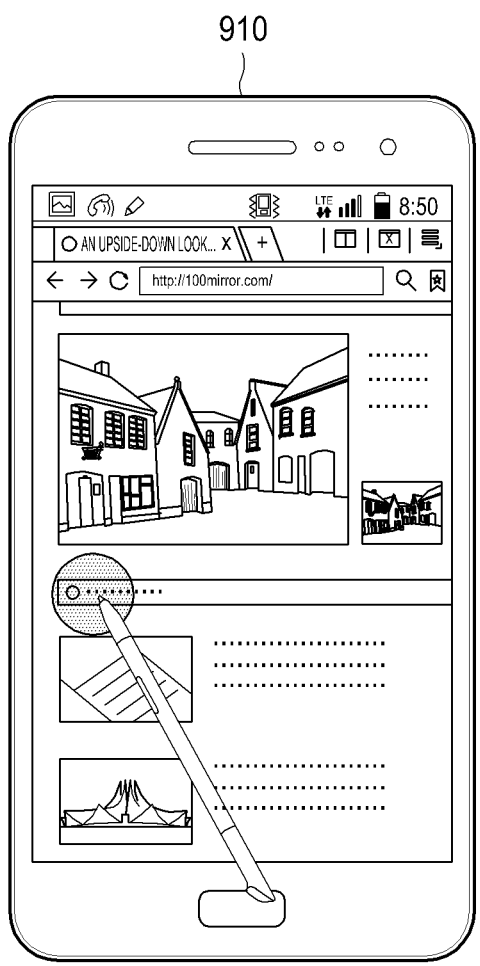
FIGS. 9 and 10 illustrate different examples of performing an operation which corresponds to a different command, depending on the type of an input tool according to an exemplary embodiment.
Figure 10:
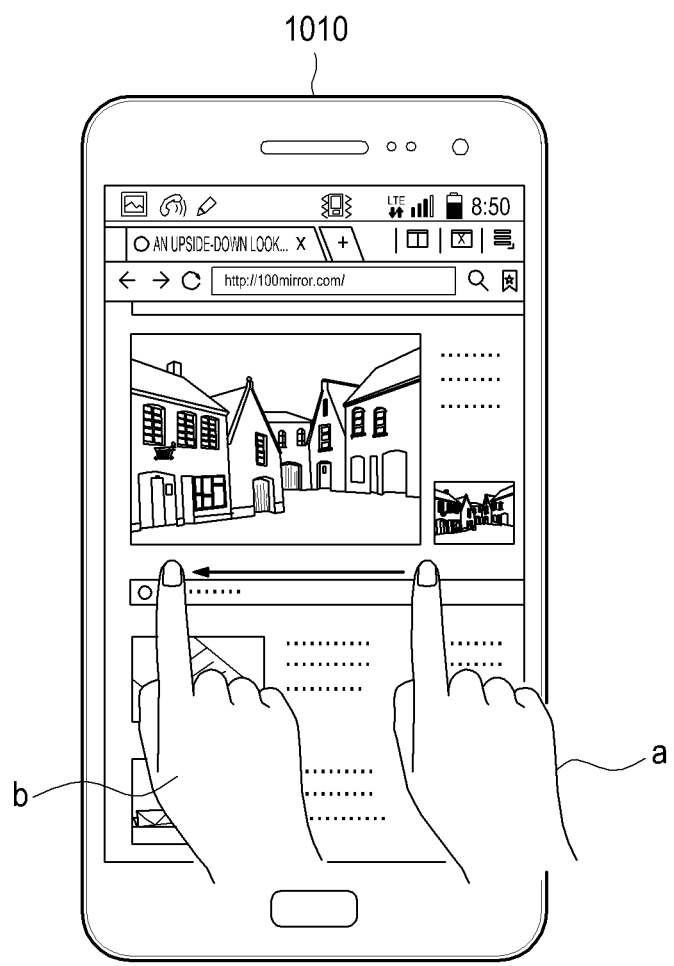

FIGS. 9 and 10 illustrate different examples of performing an operation which corresponds to a different command, depending on the type of an input tool according to an exemplary embodiment.

In the exemplary operation of FIG. 9, a stylus pen is used as an input tool. In this exemplary operation, while a specific web page is displayed, a request for movement to another web page is made by a touch command created using the stylus pen.

In the exemplary operation of FIG. 10, a fingertip is used as an input tool. In this exemplary operation, while a specific web page is displayed, an operation which corresponds to a page-move command is performed by recognizing a finger gesture.

Therefore, the user may perform a first command to click a web page with a stylus pen, and perform a second command to go to the previous page by a finger gesture.

As a result, a user terminal with a touch panel may increase or diversify the type of command that can be intuitively executed on the touch panel.

In addition, the command executer 430 may define a new command it will process based on the detection signal applied by a plurality of different input tools. For example, in response to a first input signal by the first input tool and a second input signal by the second input tool being continuously detected, the command executer 430 may determine a command to be processed, considering both the first and second input signals.

As an example, as illustrated in FIG. 6, the command executer 430 may recognize the signal input by the stylus pen as a note command, and the signal input by the fingertip as a delete command.

As is apparent from the foregoing description, according to exemplary embodiments, the command systems are additionally classified depending on the input tool, making it possible for the user to more intuitively perform many commands. The user may additionally be allowed to get the feeling of writing a note on a substance like the actual paper rather than writing on the screen, and may experience and enjoy the convenience of UIs.

While the exemplary embodiments have been shown and described, it will be understood by those skilled in the art that various changes in form and details may be made therein without departing from the spirit and scope of the inventive concept as defined by the appended claims and their equivalents.

What is claimed is:

1. A user interface method of a user terminal that uses a capacitive touch input scheme, the user interface method comprising:
    setting different commands for combinations of an input tool and a touch area;
    in response to detecting an input signal caused by a touch on a touch panel, identifying a total touch area corresponding to the touch and an input tool used for the touch based on the input signal;
    determining a command, from among the commands, corresponding to a combination of the identified total touch area and the identified input tool; and
    processing the determined command.

2. The user interface method of claim 1, wherein the identifying comprises:
    in response to determining the identified input tool is an input tool whose unit area is variable, determining the total touch area corresponding to the touch based on the input signal.

3. A user interface method of a user terminal that uses a capacitive touch input scheme, the user interface method comprising:
    setting commands which are to be processed in response to an input made by a first input tool;
    setting commands which are to be processed in response to an input made by a second input tool;
    in response to detecting an input signal caused by a touch on a touch panel, determining an area of the touch based on the input signal; and
    processing a selected command depending on the determined area,
    wherein the determining the area of the touch comprises:
        identifying an input tool that was used during the touch, based on the input signal; and
        in response to the identified input tool being an input tool whose touch area is variable, determining an area of the touch based on the input signal, and
    wherein a unit area of the first input tool is variable and a unit area by the second input tool is invariable.

4. The user interface method of claim 3, wherein the processing comprises:
    in response to the selected command being a command to delete information displayed on a screen, deleting information displayed on the screen depending on the determined total area.

5. The user interface method of claim 4, wherein the processing comprises:
    in response to the input tool used for the touch being the first input tool and the selected command being a command to delete information displayed on the screen, checking a delete area decision option that is set in advance in order to delete information displayed on the screen; and
    selecting at least one of the determined total area, a partial area determined by reducing the determined total area at a predetermined ratio, and an extension area determined by extending the determined total area at a predetermined ratio, based on the checked delete area decision option, and determining the selected one area as an area where information is to be deleted from the screen.

6. The user interface method of claim 5, wherein the predetermined ratio for reduction is different from the predetermined ratio for extension.

7. The user interface method of claim 3, wherein the processing comprises:
    upon continuously detecting an input signal by the first input tool and an input signal by the second input tool, processing a command which corresponds to the input signal by the second input tool by additionally considering the input signal by the first input tool.

8. A user terminal for processing an input from a user by using a capacitive touch input scheme, the user terminal comprising:
- a monitoring circuit configured to monitor an input signal that is generated by a touch on a touch panel; and
- a processor configured to set different commands for combinations of a input tool and a touch area, in response to receiving an input signal generated by the touch and detected by the monitoring unit, identify a total touch area corresponding to the touch and an input tool used for the touch based on the input signal, determine a command, from among the commands, corresponding to a combination of the identified total touch area and the identified input tool, and process the determined command.

9. The user terminal of claim 8, wherein the processor is configured to,
- in response to determining that the identified input tool is an input tool whose unit area is variable, determine the total touch area corresponding to the touch based on the input signal.

10. A user terminal for processing an input from a user by using a capacitive touch input scheme, the user terminal comprising:
- a monitoring circuit configured to monitor an input signal that is generated by a touch on a touch panel; and
- a processor configured to:
- set commands which are to be processed in response to an input made by a first input tool;
- set commands which are to be processed in response to an input made by a second input tool; in response to receiving an input signal generated by the touch and detected by the monitoring unit, determine an area of the touch based on the input signal;
- differently process a selected command depending on the determined area;
- identify an input tool that was used during the touch, based on the input signal; and
- in response to the identified input tool being an input tool whose touch area is variable, determine an area of the touch based on the input signal,
- wherein a unit area of the first input tool is variable and a unit area by the second input tool is invariable.

11. The user terminal of claim 10, wherein the processor is configured to, in response to the selected command being a command to delete information displayed on a screen, delete information displayed on the screen depending on the determined total area.

12. The user terminal of claim 11, wherein the processor is configured to:
- in response to the input tool used for the touch being the first input tool and the selected command being a command to delete information displayed on the screen, check a delete area decision option that is set in advance to delete information displayed on the screen; and
- select at least one of the determined total area, a partial area determined by reducing the determined total area at a predetermined ratio, and an extension area determined by extending the determined total area at a predetermined ratio, based on the checked delete area decision option, and determine the selected one area as an area where information is to be deleted from the screen.

13. The user terminal of claim 12, wherein the predetermined ratio for reduction is different from the predetermined ratio for extension.

14. The user terminal of claim 10, wherein the processor is configured to, in response to continuously detecting an input signal by the first input tool and an input signal by the second input tool, process a command corresponding to the input signal by the second input tool by additionally considering the input signal by the first input tool.

15. A user terminal for processing an input from a user by using a capacitive touch input scheme, the user terminal comprising:
- a touch panel configured to generate an input signal in response to detecting a touch;
- a processor configured to identify a total touch area corresponding to the touch based on the input signal, identify an input tool used for the touch based on the identified total area, and process a command selected from among a plurality of predetermined commands based on a combination of the identified total area and the identified input tool, upon receiving the input signal generated by the touch from the touch panel.

16. The user terminal of claim 15, further comprising a monitoring circuit configured to monitor the input signal that is generated by the touch on the touch panel.

17. The user terminal of claim 15, wherein the processor is configured to identify whether the input tool has an adjustable touch size based on at least one of an amount of capacitance change caused by the touch and a size of an area where capacitance change occurred by the touch.

18. The user terminal of claim 17, wherein the processor is configured to, in response to the identified input tool being an input tool having an adjustable touch size, determine a total area corresponding to the touch for applying the selected command.

19. The user terminal of claim 18, wherein the processor is configured to delete information displayed on a screen depending on the determined total area, in response to the selected command being a command to delete information displayed on the screen.

20. A user terminal for processing an input from a user by using a capacitive touch input scheme, the user terminal comprising:
- a processor configured to set on a touch panel a first input tool whose touch area may be changed during a touch, and a second input tool whose touch area may not be changed during a touch on the touch panel, set commands which are to be processed in response to an input made by the first input tool, set commands which are to be processed in response to an input made by the second input tool, identify an input tool that was used during the touch based on the input signal generated by the touch, in response to the identified input tool being the first input tool determine an area of the touch based on the input signal, differently process a selected command depending on the determined area, and delete information displayed on the screen depending on the determined area, in response to the selected command being a command to delete information displayed on a screen;
- a monitoring circuit configured to monitor the input signal that is generated by the touch on a touch panel.

21. The user terminal of claim 20, wherein the processor is configured to process a command which corresponds to the signal input by the second input tool by additionally considering the input signal by the first input tool.

* * * * *